J. H. MOSS, DEC'D.
C. B. MOSS, ADMINISTRATOR.
CLUTCH.
APPLICATION FILED MAR. 20, 1913.
1,167,590.
Patented Jan. 11, 1916.
2 SHEETS—SHEET 2.
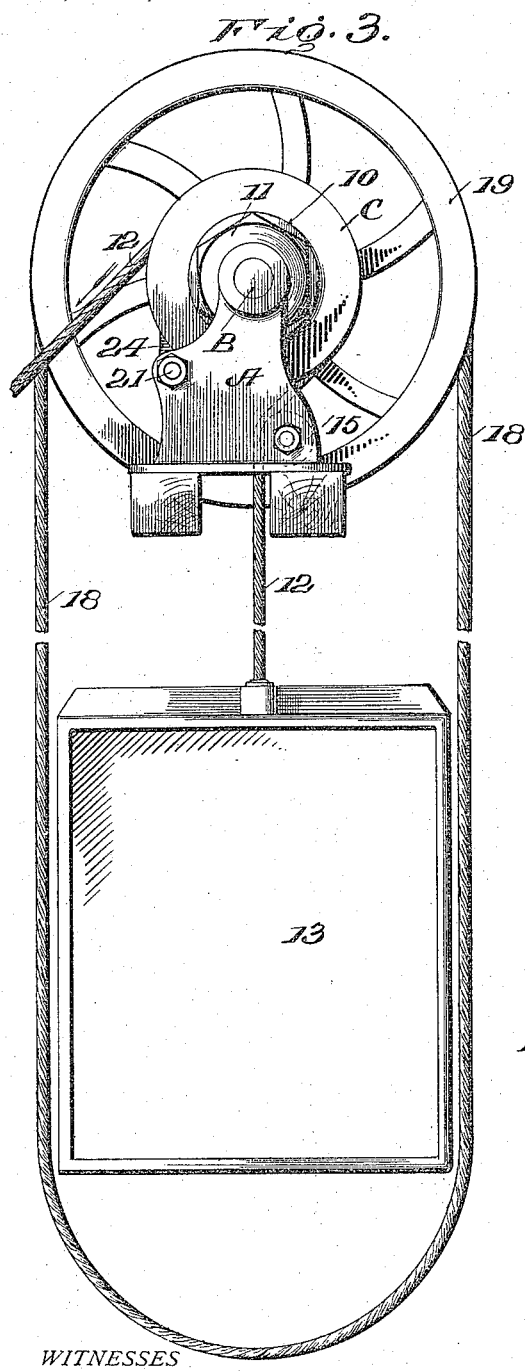
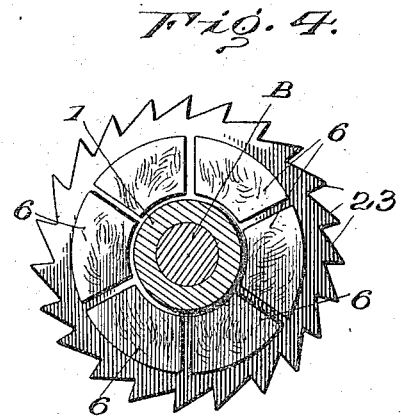
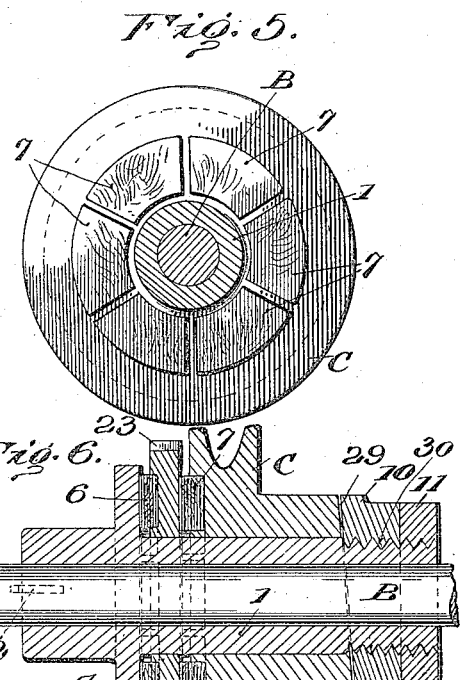
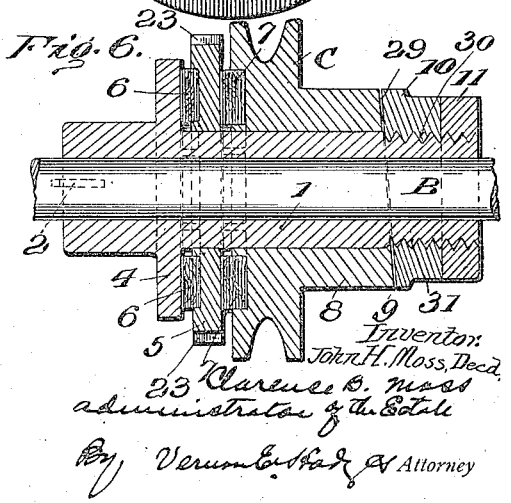

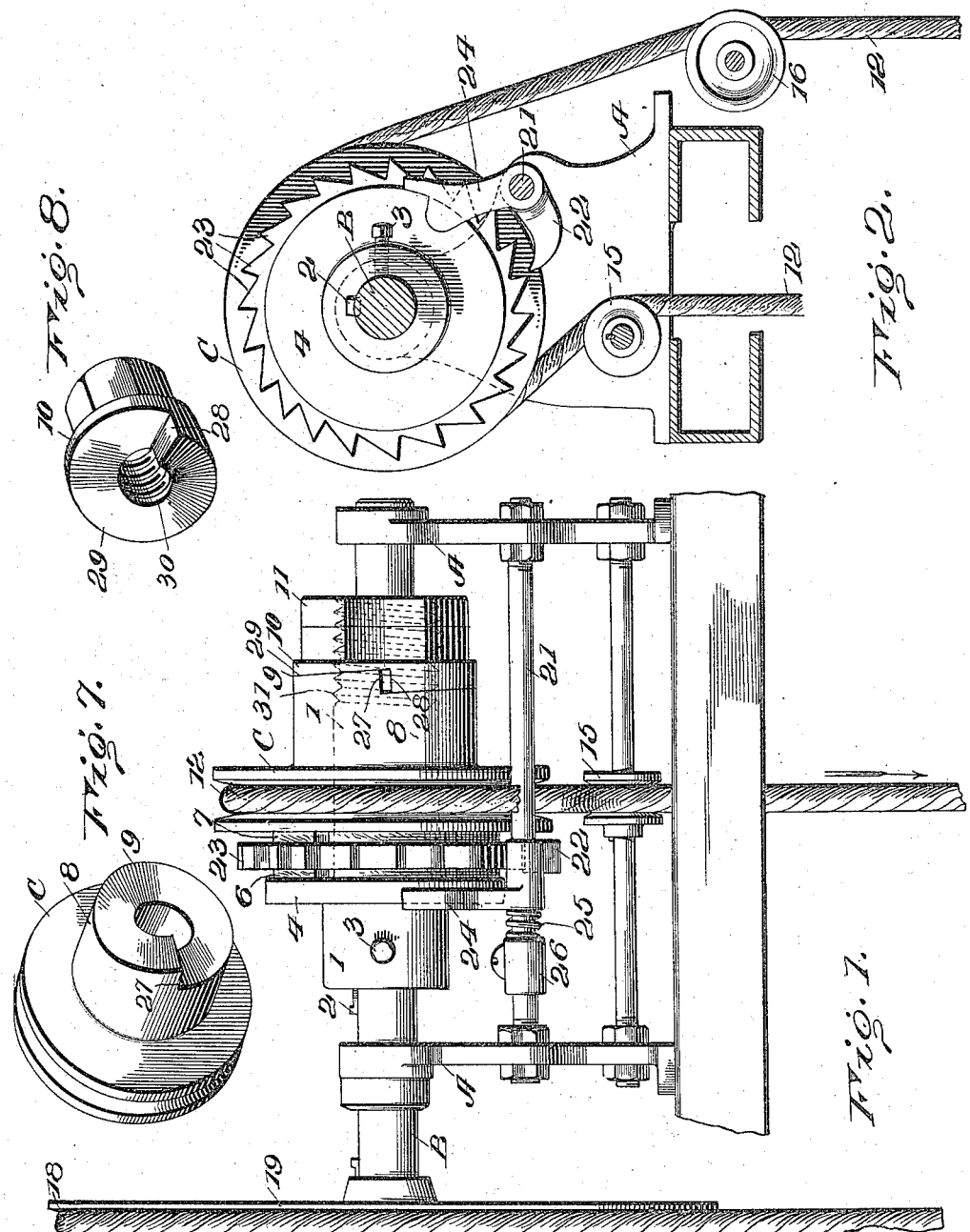

UNITED STATES PATENT OFFICE.

JOHN H. MOSS, DECEASED, BY CLARENCE B. MOSS, ADMINISTRATOR, OF GLEN RIDGE, NEW JERSEY.

CLUTCH.

1,167,590.  Specification of Letters Patent.  Patented Jan. 11, 1916.

Application filed March 20, 1913. Serial No. 755,798.

*To all whom it may concern:*

Be it known that I, CLARENCE B. MOSS, a citizen of the United States, residing at Glen Ridge, county of Essex, and State of New Jersey, administrator of the estate of JOHN H. MOSS, deceased, late a citizen of the United States, do hereby make application for certain new and useful Improvements in Clutches, invented by the said JOHN H. MOSS, of which the following is a specification.

This invention relates to an improvement in clutches especially applicable to dumb waiters, and the object is to provide means whereby the pulley wheel, over which the rope, which is connected to the car, passes, may be stopped at any point and prevent the elevator car from moving up or down in the well.

The invention consists of certain novel features of construction and combination of parts which will be hereinafter fully described and pointed out in the claim.

In the accompanying drawings, Figure 1 is a view in front elevation of a dumb waiter or elevator to which the improvements are applied; Fig. 2 is an end elevation; Fig. 3 is a view in side elevation; Fig. 4 is a side elevation of the ratchet wheel and pawl; Fig. 5 is a side view of the pulley showing the friction plates or blocks; Fig. 6 is a transverse section through the clutching mechanism; Figs. 7 and 8 are perspective views of the clutch faces of the pulley and collar.

"A" represents the support, and "B" is the shaft, which is mounted upon the support at the top of the well. A sleeve, 1, is keyed to the shaft by key 2, and is further held against horizontal movement by screw 3, which passes through the sleeve and engages the shaft B. A disk, 4, is integrally formed on the sleeve, and a ratchet wheel, 5, which is loosely mounted on the sleeve, is adapted to be held in engagement with the disk by friction blocks 6 of wood or other suitable material, mounted on one side of the ratchet wheel. A clutch pulley, "C" is loosely mounted on the sleeve 1, and in one face thereof friction blocks 7, of wood or other suitable material, are located, which are adapted to engage one of the sides of the ratchet wheel 5. The hub 8 of the pulley "C" is provided at this end with a beveled ratchet cam, which consists of a beveled cam surface 9 and a tooth 27.

The sleeve 1 is provided with screw threads 31, with which the screw threads 30 of a collar 10 engage for the purpose of connecting the collar to the sleeve and permitting of the collar having longitudinal movement or adjustment on the sleeve. A nut, 11, is screwed upon the sleeve for locking the collar against rearward movement after it has been properly positioned. The collar 10 is provided on its inner face with a beveled ratchet cam, which consists of a cam surface 29 and a tooth 28. Passing over the pulley "C" is a rope 12, one end of which is connected to car 13, and the other end is connected to a counter weight (not shown). The counter weight is preferably heavier than the car 13, and the rope 12 passes over a pulley 15 before passing over the pulley wheel "C," and then from the pulley wheel over pulley 16. The rope then extends to the counter weight. The shaft B is provided with a large set pulley 19, over which passes an endless rope, 18, for operating the car. A rod, 21, is supported by the supports "A," and mounted upon the rod is a pawl 22, which pawl is adapted to engage the teeth 23 of the ratchet wheel 5 to prevent the latter from backward movement when clamped against the disk 4. When it is desired to adjust the sleeve 1 to any desired point along the shaft B, the pawl 22 is moved along the rod 21, and brought into engagement with teeth 23 of the ratchet wheel.

In order to prevent the pawl from trailing over the ratchet teeth in their upward rotation, making a clicking noise, an arm 24 is provided, which is integral with the pawl, the free end of which overlaps and comes into frictional contact with the vertical side of disk 4. The arm is adapted to bear against the disk, to produce sufficient friction to insure the lifting of the pawl.

A coil spring 25 on the rod 21 is held in place by collar 26 and the spring keeps the shoe or arm constantly against the side of the disk. Whenever the disk 4 is revolved to the right, the arm 24 raises pawl 22 out of engagement with ratchet teeth 23, but when the disk 4 is revolved in the opposite direction, the arm 24 throws the pawl 22 into engagement with the ratchet teeth 23. After the pulley C and ratchet wheel have been loosely mounted upon the sleeve 1, so that the friction blocks 6 of the ratchet wheel are brought into engagement with disk 4, and frictional blocks 7 of the pulley are in engagement with ratchet wheel 5, the collar 10 is then screwed on the sleeve 1, so that the cam face 29 of the collar and cam face 9 of the pulley hub are together and the teeth 27 and 28 are adjusted a slight distance apart. The operativeness of the device depends upon the proper adjustment of the cam collar 10 with respect to the hub 8 of the pulley. Disk 4 limits the lateral movement of the pulley C on the sleeve in the direction toward the disk, while the collar 10 is held against rearward movement by the nut 11, and the collar limits the lateral movement of the pulley C in the direction of the collar. The tooth 28 of the collar 10 limits the independent rotation of the pulley C in its direction, and the beveled cam face 29 of collar 10 limits the independent rotation of the pulley C in the opposite direction.

The loosely mounted ratchet wheel 5, in conjunction with pawl 22, makes possible the lowering of the car and also the sustaining of the load at any desired point for the following reasons: When the car is loaded, it tends to rotate the pulley C independently to the left, and the cam surface 9, rotating against the cam face 29, produces a lateral movement of the pulley C toward the ratchet wheel 5, which binds the ratchet wheel against disk 4. Now, when the shaft is revolved to the left, it rotates everything on the shaft with it, except the ratchet wheel 5, which is held against such revolution by the pawl 22, and in such revolution the stationary ratchet wheel 5, against which the pulley C is revolved, overcomes the tendency of the pulley to move laterally toward the ratchet wheel 5, and tends to produce a counter lateral movement of the pulley C in the opposite direction, which is sufficient to permit the pulley to be revolved against the ratchet wheel 5 to the left with the shaft B, thus lowering the car. When the revolution of the shaft B is stopped, the loaded car, tending to independently rotate the pulley C to the left, again causes the pulley C to bind against the ratchet wheel 5, and the ratchet wheel against the disk 4, and as the pawl 22 is in engagement with the teeth of the ratchet wheel 5, the parts are locked against further independent rotation to the left, and thereby the car is brought to a stop and the load sustained. The pulley block 7, engaging against the face of the ratchet wheel 5, and the ratchet wheel block 6 engaging the face of the disk 4, produce sufficient friction, for raising the loaded car, and in sustaining the load.

Having described the preferred mode of construction and the principles which make the device self retaining on the shaft, the operation of the car will now be set forth.

Assuming that the empty car is at the bottom of the well and it is desired to raise it. As the counterweight (not shown) is heavier than the car 13 it will tend to rotate the pulley C to the right independently until the tooth 27 of the pulley hub 8 locks against the tooth 28 of the collar 10 which is held against backward movement by the nut 11 which prevents further independent rotation in that direction. Then a downward pull on the hoist rope 18 on the right hand side of the hoist wheel 19 will cause the shaft B and the whole device to revolve to the right, thus raising the car. In this operation if the weight of the counterbalance is not sufficient to rotate the pulley C to the right independently then the pulley would remain stationary until the rotation of the collar 10 to the right brings its cam face 29 into engagement with the cam face 9 of the pulley hub 8 when the rotation of the collar 10 to the right forces the pulley C with its friction blocks 7 laterally against the ratchet wheel 5 which is forced laterally toward the disk 4 against which the ratchet wheel friction blocks 6 become engaged and revolves as a unit with the shaft to the right, thus raising the car as long as the pull is continued. Having raised the empty car to the desired point let it be assumed that the car is loaded with articles to be lowered. As the car 13 is loaded it will become heavier than the counterweight, which increased weight will rotate the pulley C to the left independently and the cam face 9 rotating against the cam face 29 of the collar 10 will cause a lateral movement of the pulley C forcing the friction blocks 7 against the ratchet wheel 5 and the friction blocks 6 against the disk 4 which prevents further lateral movement of the pulley C in that direction and the cam face 9 of the pulley hub 8 being in engagement with the cam face 29 of the collar 10 locks the pulley C against further independent rotation to the left and the device then being connected as a unit for rotation in that direction any further rotation to the left will cause the pawl 22 to engage the teeth 23 of the ratchet wheel 5 holding the device against such independent rotation which holds the car stationary and sustains the load. When it is desired to lower the loaded car from this position a downward pull on the hand rope 18 on the left hand side of the hoist wheel 19 will cause the shaft B and the whole device to revolve to the left, but the revolution of the disk 4 to the left will immediately cause the pawl 22 to engage the teeth 23 of the ratchet wheel 5 holding the ratchet wheel stationary against such revolution and when the ratchet wheel 5 is so held stationary the continued revolution of pulley C against it tends to move the pulley C laterally toward the collar 10 and away from the ratchet wheel 5 sufficiently so that such continued pull on the hand rope revolves the pulley to the left and lowers the car to the desired point. As soon as the downward pull on the hand rope is stopped the device again becomes connected as above and sustains the load. Thus the device is self-retaining on the shaft. It is now desired to raise the car loaded. A downward pull on the hand rope 18 on the right hand side of the hoist wheel 19 will revolve the shaft B and the whole device as a unit to the right raising the car. Upon ceasing the downward pull the device becomes stationary and sustains the load. This is because the cam face 9 of the pulley C is engaged by the cam face 29 of the collar 10 held against backward movement by the nut 11 and as the disk 4 prevents further lateral movement of the pulley C in that direction and the weight of the car 13 tending to rotate the device to the left connects the whole device and immediately throws the pawl 22 into engagement with the teeth of the ratchet wheel 5 holding the device stationary and sustaining the load. Thus the device is self-retaining on the shaft. Now upon removing the load the counterweight being heavier than the car 13 will tend to rotate the pulley C to the right independently until the tooth 27 of the pulley cam comes against the tooth 28 of the collar cam thereby preventing further independent rotation of the pulley C. It is now desired to lower the empty car. A downward pull on the hand rope 18 on the left hand side of the hoist wheel 19 will revolve the shaft B with attached sleeve and its collar to the left, and the tooth 27 of the pulley being engaged by the tooth 28 of the collar preventing further rotation of the pulley C to the right, the pulley C must revolve with the collar to the left, thus lowering the car. In this movement the ratchet wheel 5 is held stationary by the pawl 22. Upon ceasing the downward pull the device becomes stationary with the car. Thus the car may be raised and lowered in the well whether empty or loaded by simply pulling downward on one side or the other of the hand rope and when such pull on the hand rope is stopped the device is self-retaining on the shaft and the car is held stationary at any desired point.

Having fully described this invention, what I caim as new and desire to secure by Letters Patent is—

In a clutch mechanism, the combination with a shaft, of a removable sleeve having a disk thereon and fixedly attached to the shaft, a ratchet wheel loosely mounted on the fixedly attached sleeve having frictional blocks on one face adapted to engage the face of the disk, a pulley loosely mounted on the fixedly attached sleeve having friction blocks adapted to engage the face of the ratchet wheel, a beveled face on the pulley, a collar, having a beveled face, mounted to rotate with the shaft, the beveled face of the collar and pulley adapted to engage to move the pulley laterally and away from the collar for producing a friction between the pulley, ratchet wheel, and disk, for binding the collar, pulley, and ratchet wheel and disk together for revolution as a unit in one direction, the edges of the beveled faces of the collar and pulley being adapted to be engaged to prevent revolution of the pulley independent of the ratchet wheel in one direction, but allowing the pulley, collar, ratchet wheel and disk to rotate together with the shaft in a contrary direction, means engaging the ratchet wheel for holding it against rotation in one direction, means for revolving the shaft, and means actuated upon the rotation of the shaft for releasing the ratchet-engaging means from engagement with the ratchet wheel whereby the ratchet wheel may be freely rotated.

In testimony whereof I affix my signature, as administrator of the estate of JOHN H. Moss, deceased, in the presence of two witnesses.

CLARENCE B. MOSS,
*Administrator of the estate of John H. Moss, deceased.*

Witnesses:
E. VAUGHAN, Jr.,
FRANCIS X. VELLY.